US006227086B1

(12) United States Patent
Lumberg

(10) Patent No.: US 6,227,086 B1
(45) Date of Patent: May 8, 2001

(54) RADIAL LOG CLAMP

(75) Inventor: Eric J. Lumberg, Ashland, WI (US)

(73) Assignee: C. G. Bretting Manufacturing Co., Inc., Ashland, WI (US)

(*) Notice: Subject to any disclaimer, the term of this patent is extended or adjusted under 35 U.S.C. 154(b) by 0 days.

(21) Appl. No.: 09/352,055

(22) Filed: Jul. 14, 1999

Related U.S. Application Data

(63) Continuation of application No. 09/084,659, filed on May 26, 1998, now Pat. No. 5,941,144, which is a continuation of application No. 08/632,171, filed on Apr. 15, 1996, now Pat. No. 5,755,146.

(51) Int. Cl.[7] .............................. B26D 3/00; B26D 7/02; B23B 3/04

(52) U.S. Cl. .................................... 83/54; 83/56; 83/453; 83/458; 83/461; 269/288; 82/47; 82/53.1; 82/70.1

(58) Field of Search ............................. 269/57, 216, 224, 269/287, 288; 83/38, 78, 278, 206, 207, 458, 446, 447, 460, 461, 466, 466.1, 51, 54, 56, 453; 82/70.1, 47, 53.1

(56) References Cited

U.S. PATENT DOCUMENTS

| | | | | |
|---|---|---|---|---|
| 2,404,901 | * | 7/1946 | Cibs | 269/288 |
| 3,049,954 | | 8/1962 | Barlament et al. | 83/476 |
| 3,213,731 | | 10/1965 | Renard | 83/461 |
| 3,578,233 | * | 5/1971 | Meister | 269/288 |
| 4,159,760 | | 7/1979 | Kovacs | 198/418.1 |
| 5,038,647 | | 8/1991 | Biagiotti | 83/155.1 |
| 5,315,907 | | 5/1994 | Biagiotti | 83/38 |
| 5,357,833 | | 10/1994 | Biagiotti | 83/458 |
| 5,509,336 | | 4/1996 | Biagiotti | 83/461 |
| 5,647,259 | | 7/1997 | Biagiotti | 83/458 |
| 5,755,146 | * | 5/1998 | Lumberg | 82/70.1 |
| 5,941,144 | * | 8/1999 | Lumberg | 82/70.1 |

* cited by examiner

*Primary Examiner*—W. Donald Bray
(74) *Attorney, Agent, or Firm*—Michael Best & Friedrich LLP

(57) ABSTRACT

A rotating log saw clamp having a clamp infeed section and a clamp outfeed section located adjacent a log saw blade. The clamp infeed section and clamp outfeed section are coupled for rotation together with the log during sawing of at least a portion of the log by the log saw blade.

20 Claims, 6 Drawing Sheets

RADIAL LOG CLAMP

This application is a continuation of U.S. application Ser. No. 09/084,659 filed on May 26, 1998 (now U.S. Pat. No. 5,941,144), which is a continuation of U.S. application Ser. No. 08/632,171 filed on Apr. 15, 1996 (now U.S. Pat. No. 5,755,146).

BACKGROUND OF THE INVENTION

This invention relates generally to clamping methods and apparatus. More particularly, the invention relates to clamping methods and apparatus for securing long rolls of paper (commonly referred to in the trade as "logs") during sawing processes.

Many types of paper are produced in logs for ease of manufacture. These logs must typically be sawn into shorter rolls more readily used by consumers and the like. Automating the sawing process is necessary to achieve satisfactory production rates. Typically, automated sawing processes have utilized a reciprocating or orbital radial or band saw in combination with a stationary log clamp.

Bias cutting and inadequate clamping of the log reduce the yield of prior art sawing processes. Tremendous pressure is placed on the saw blade as it cuts into the log because the saw blade is normally toothless to avoid shredding the log. Thus, this cutting process requires greater force to shear the log than a process involving a blade with teeth, increasing bias cutting and log core crushing problems.

Prior art clamps secure a log using elastic straps or grippers during the sawing process and may adjust for varying diameters. However, these clamps may allow slight movement during the sawing process, especially for logs of large diameter and heavy density. The clamp should stably hold the log when the blade applies large forces attempting to penetrate the paper. Therefore, a need exists for a clamping device which securely holds the log, helps the blade saw the log without bias cutting and adjusts for varying log diameters.

SUMMARY OF THE INVENTION

Accordingly, it is an object of the invention to provide a novel log saw clamp.

It is a further object of the invention to provide an improved log saw clamp that rotates while securely holding the log.

It is a still further object of the invention to provide a novel log saw clamp that automatically adjusts to varying log diameters.

It is another object of the invention to provide an improved log saw clamp that reduces bias cutting, thereby substantially improving product quality.

It is yet another object of the invention to provide a novel log saw that reduces required log saw stroke by about fifty percent In accordance with one form of the invention, the log saw clamp includes a clamp infeed section and a clamp outfeed section rotating at the same speed adjacent a log saw. Another preferred embodiment of the invention comprises a staging section, a clamp infeed section, a log saw, a clamp outfeed section and a drive mechanism. The clamp infeed section and clamp outfeed section preferably rotate together, and securely hold the log during the sawing process.

Further objects and advantages of the present invention, together with the organization and manner of operation thereof, will become apparent from the following detailed description of the invention when taken in conjunction with the accompanying drawings, wherein like elements have like numerals throughout the drawings.

DETAILED DESCRIPTION OF PREFERRED EMBODIMENTS

Figure 1:
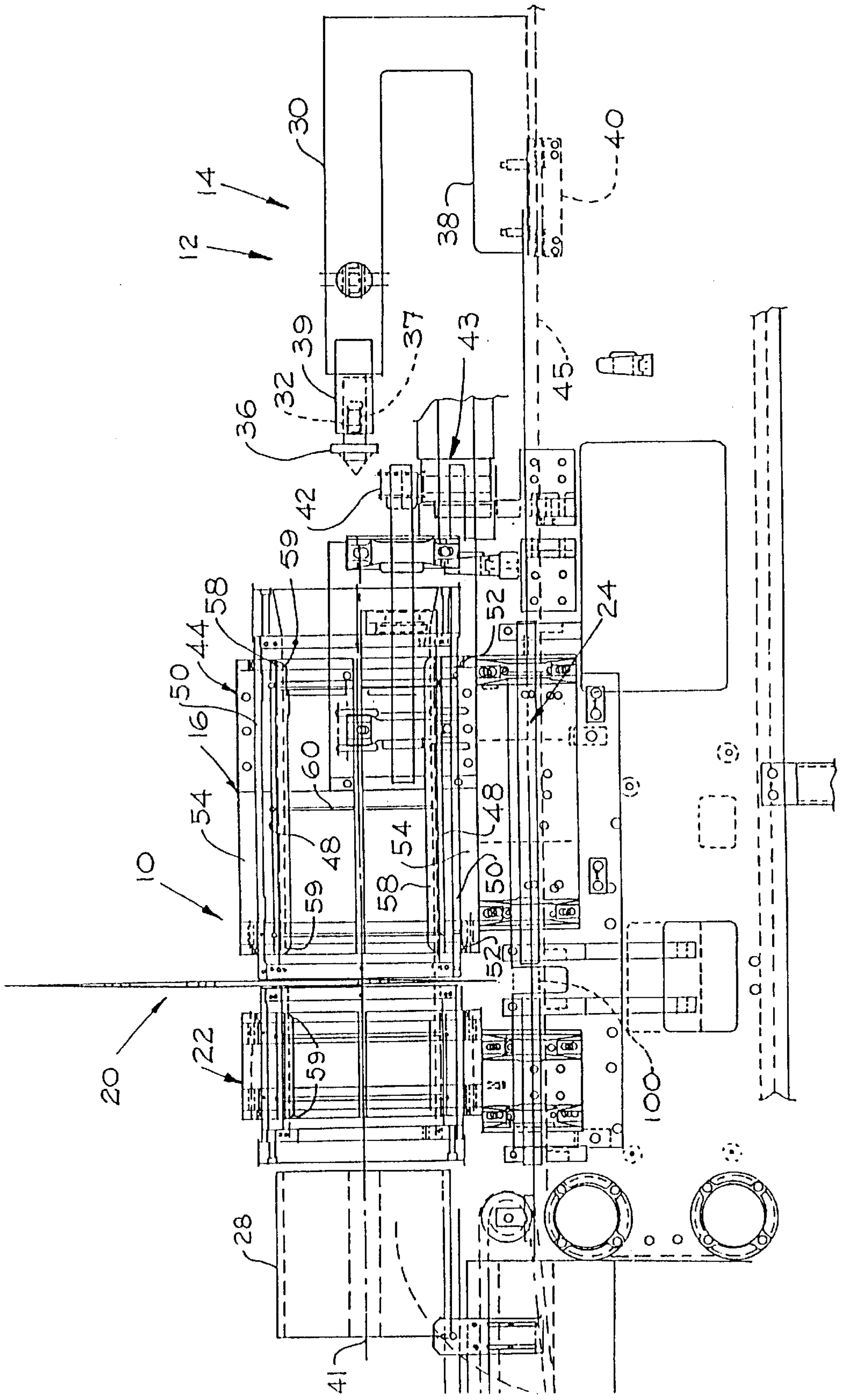
FIG. 1 is a side view of a log saw clamp constructed in accordance with one preferred embodiment of the invention.

Referring to the figures, and more particularly to FIG. 1, a log saw clamp constructed in accordance with one preferred embodiment of the invention is illustrated at 10. The log saw clamp 10 preferably includes a staging section 12 with a log pusher 14, a clamp infeed section 16, a log saw 20, a clamp outfeed section 22 and a drive mechanism 24. The staging section 12 properly locates and accelerates material to be sawn. The log pusher 14 of the staging section 12 then pushes the material into the clamp infeed section 16 until a portion of the material extends past the log saw 20 into the clamp outfeed section 22. Both the clamp infeed section 16 and the clamp outfeed section 22 are driven to rotate at the same speed during sawing by the drive mechanism 24 shown in FIG. 3. After sawing, the sawn material is discharged by the log pusher 14 and then handled in a conventional manner.

While a log pusher 14 is described herein for illustrative purposes, the log pusher 14 can also comprise any number of pushing or pulling mechanisms for placing a log 28 comprising rolled paper or other material to be sawn in the desired position.

The log pusher 14 comprises a base 38 and an arm 30 connected with a bearing 32 or other connection to a rotatable end 36. The rotatable end 36 can comprise a variety of shapes, but preferably comprises a self-centering cone shown in phantom in FIG. 1. Alternatively the rotatable end 36 can comprise a coupled pair of concentric disks arranged so one disk fits inside the core of the log 28 or other material to be sawn and the other disk contacts the log 28.

The bearing 32 can include various coupling mechanisms to connect the rotating end 36 to the nonrotating arm 30. Further, various joints 37, (e.g., a ball joint) can be used in combination with the bearing 32 to enable the rotating end 36 to pivot about an axis substantially parallel to the longitudinal axis 41 (defined by the centers of the clamp infeed section 16 and clamp outfeed section 22) or preferably to pivot or "wobble" in a variety of directions. The arm 30 is conventionally connected to the joint 37 or bearing 32. In one preferred embodiment, a housing 39 connected to the arm 30 covers the bearing 32 and joint 37.

The arm 30 is attached to or integral with a base 38. The base 38 travels on a cart 40, preferably on a rail 45 or other conventional mechanical guide along an axis substantially parallel to the longitudinal axis 41. The cart 40 can be moved on the rail 45 using conventional chain or gear drives, air or hydraulic cylinders or the like.

The staging section 12 further includes a plurality of infeed rollers 42 for substantially matching the rotational speed of the log 28 to the rotational speed of the clamp infeed section 16 and clamp outfeed section 22. The infeed rollers 42 can be driven by a variety of conventional mechanisms or can be driven by the mechanisms shown in FIG. 3. Preferably, the infeed drive 43 accelerates the log 28 from a standstill to the rotational speed of the clamp infeed section 16 in a fast and controlled manner. It will be apparent to one of ordinary skill in the art that a variety of infeed roller 42 configurations can be used without departing from the invention. After the infeed rollers 42 have accelerated the log 28 to the desired speed, the log pusher 14 indexes the log 28 to the desired position in the log saw clamp 10.

Referring to FIGS. 4 through 10, the clamp infeed section 16 includes a frame 44 comprising a clamp inner tube 48 and a clamp outer tube 50 connected at the ends of the tubes 48, 50. While the frame 44 can be manufactured in a variety of shapes, preferably a round shape is used. In one preferred embodiment of the invention, the clamp inner tube 48 and the clamp outer tube 50 have diameters sized so as to allow an interstitial space sufficient to house portions of a plurality of clamp fingers 58. Bearings 52, preferably KC110XPO Kaydon Ball Bearings (manufactured by Kaydon Bearing Corporation of Muskegon, Mich.) are used in combination with other annular bearings, and couple the frame 44 to a rotating spacer 54 in a conventional manner.

The clamp inner tube 48 preferably includes a plurality of slots 55 substantially parallel to the longitudinal axis 41 for retaining the clamp fingers 58. The clamp fingers 58, shown in FIGS. 6 and 7, preferably include chamfered or beveled ends and are spaced radially to engage the log 28. The clamp fingers 58 can comprise any variety of shapes elongated in length and depth, but preferably comprise substantially T-shaped or angular structures. In one preferred embodiment of the invention, T-shaped clamp fingers 58 are held in the slots 55 by the heads of the T, while the leg of the T contacts and holds the log 28 in the same way shown in FIG. 4. Of course, the clamp fingers 58 can comprise a variety shapes which allow resilient retention adjacent the log 28. For example, the clamp fingers 58 could be resiliently retained in a mounting which reversed the orientation of a T, wherein the head of the contacted log 28 and the leg was resiliently held outward from the log 28. Other resilient retention configurations can be used without departing from the invention.

Figure 7:
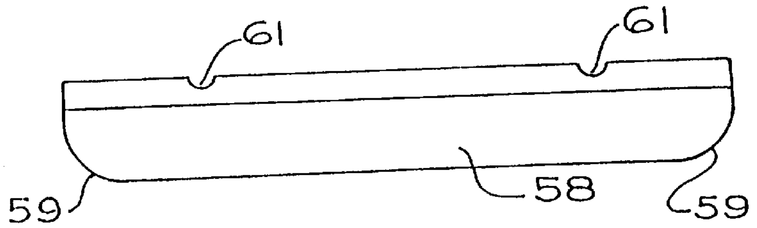
FIG. 7 is a side view of the substantially T-shaped clamp fingers shown in FIGS. 1, 3, 4, 5, and 6.
Figure 8:
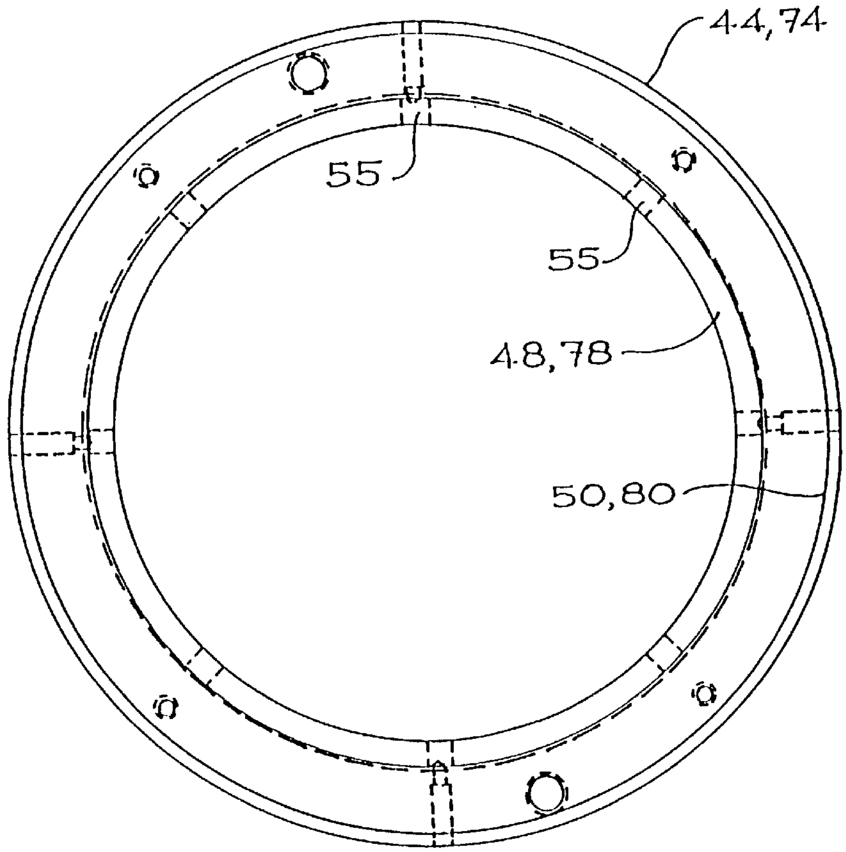
FIG. 8 is a front view of the frame for the clamp infeed section and clamp outfeed section shown in FIGS. 1, 3, 4, 5, 6, and 7.
Figure 9:
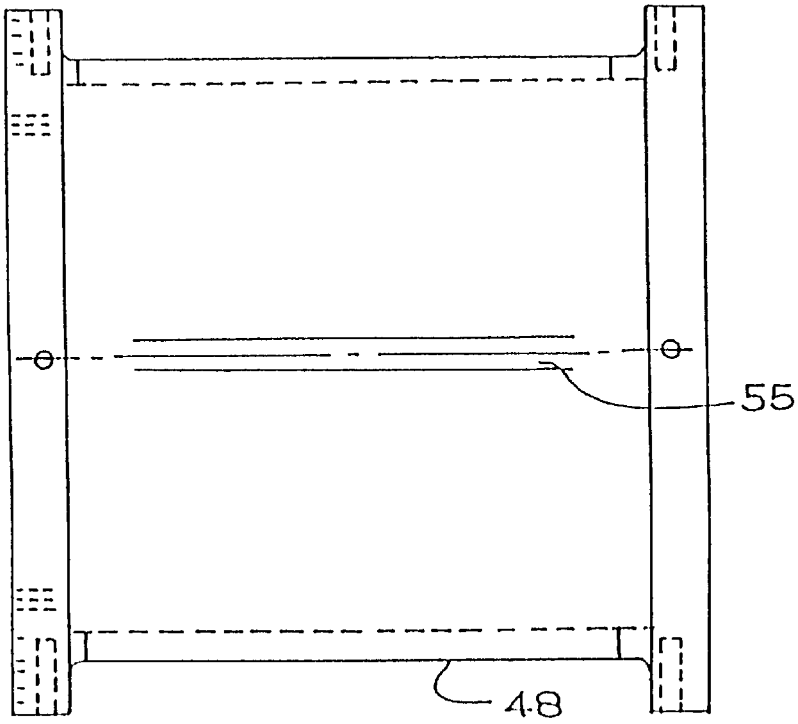
FIG. 9 is a side view of the clamp outfeed section shown in FIGS. 1, 3, 4, 5, 6, 7, and 8.
Figure 10:
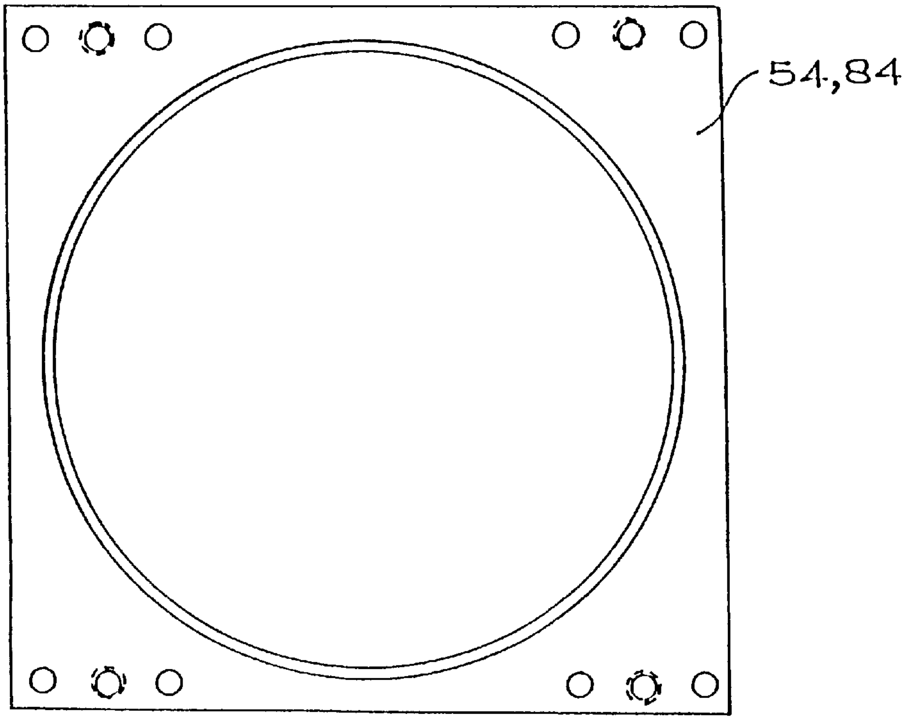
FIG. 10 is a front view of the spacer for the clamp infeed section and clamp outfeed section shown in FIGS. 1, 3, 4, 5, 6, 7, 8, 9, and 10.

A plurality of resilient members such as elastic belts 60 wrap around the heads of the clamp fingers 58, applying pressure to secure the log 28. The elastic belts 60 can comprise various elastic materials, but preferably comprise ¼" Textane brand belts manufactured by Thermoid Corporation of Chaute, Kans. The elastic belts 60 can be retained in position by grooves 61 or the like on the clamp fingers 58 as shown in FIG. 7. Alternatively, one large elastic belt can be used for each clamp section, or individual springs or the like can be used to resiliently retain the clamp fingers 58, 88.

Figure 2:
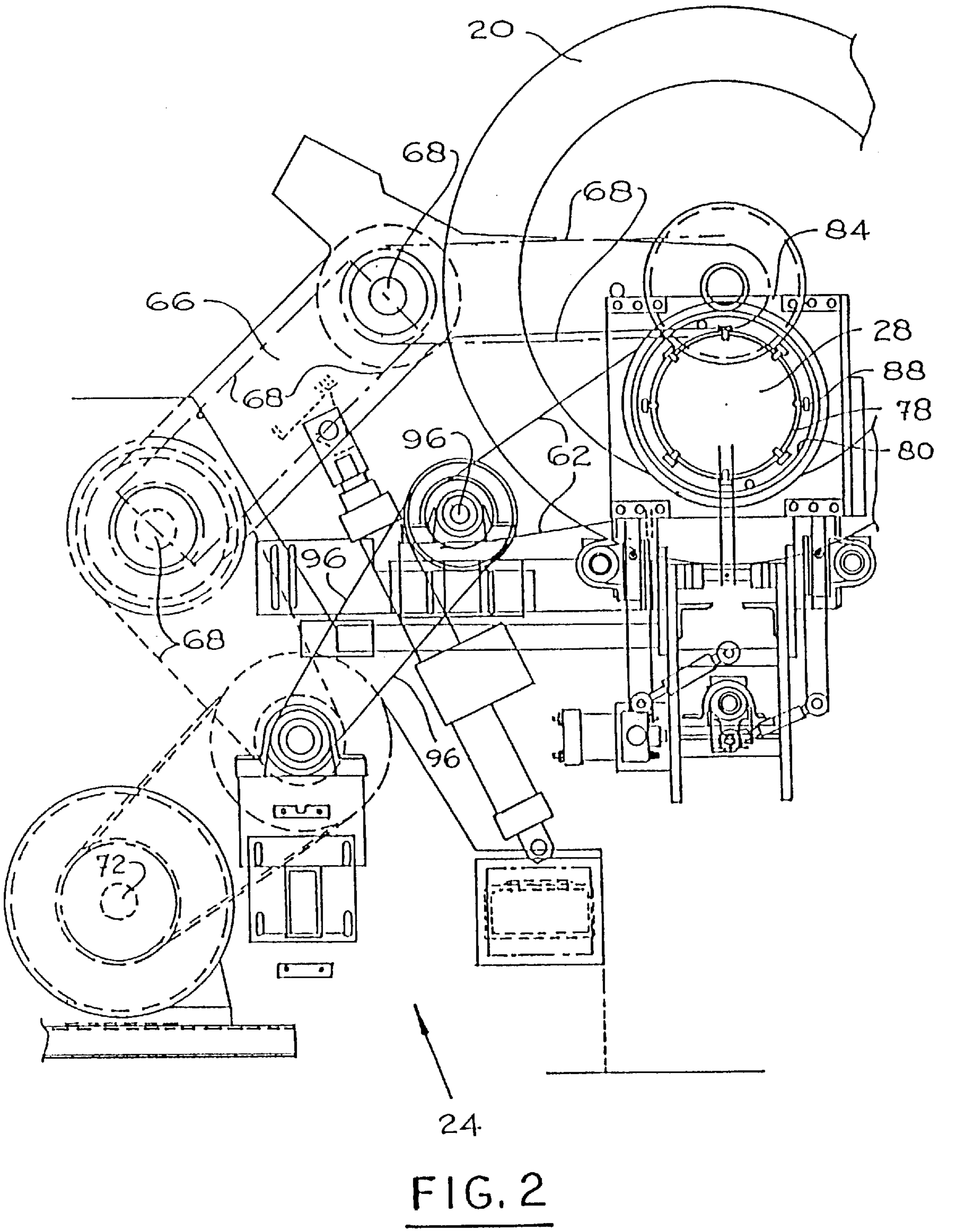
FIG. 2 is a front view of a log saw blade and drive mechanism shown in FIG. 1.

The clamp infeed section 16 can be rotated in a variety of conventional methods by the drive mechanism 24. In one preferred embodiment of the invention, a plurality of drive belts 62, shown in FIG. 2, are coupled to the frame 44 and are driven by the drive mechanism 24 and provide rotation of the frame 44 and log 28. Various methods known to one of ordinary skill in the art can be used to couple the drive belts 62 to the frame 44.

In an alternative embodiment of the invention, the clamp infeed section 16 and the clamp outfeed section 22 do not rotate. This arrangement substantially increases the likelihood of bias cutting with dense materials, but the unique clamping of the invention still provides advantages over prior art clamps.

Referring to FIG. 2, the log saw blade 20 is coupled to a pivoting arm 66 for lowering the log saw blade 20 into the log 28. A variety of conventional mechanisms can be used to rotate the blade 20. In the preferred embodiment, the blade 20 rotates by the use of a series of gears, belts or chains 68 connected to a motor 72. Alternatively, the log 28 can be "sawn" by a log saw comprising high pressure fluid or solid application, or even hot wire, torch or laser cutting.

As illustrated in FIGS. 4 through 10, the clamp outfeed section 22 is preferably virtually identical to the clamp infeed section 16 except for different lengths and location. The clamp outfeed section 22 preferably includes a frame 74 comprising a clamp inner tube 78 and a clamp outer tube 80 connected at their ends. While the frame 74 may be manufactured in a variety of shapes, preferably a round shape is used. In one preferred embodiment of the invention, the clamp inner tube 78 and the clamp outer tube 80 have diameters sized so as to allow an interstitial space sufficient to house portions of a plurality of clamp fingers 88. Bearings 82, preferably KC110XPO Kaydon Ball Bearings (manufactured by Kaydon Bearing Corporation of Muskegon, Mich.) couple the frame 74 to a rotating spacer 84.

The clamp inner tube 78 preferably includes a plurality of slots 55 substantially parallel to the longitudinal axis 41 for retaining the clamp fingers 88. The clamp fingers 88, shown in FIGS. 6 and 7, preferably include chamfered or beveled ends and are spaced radially to engage the log 28. The clamp fingers 88 can comprise any variety of shapes elongated in length and depth, but preferably comprise substantially T-shaped or angular structures. Of course, the clamp fingers 88 can comprise a variety of shapes which allow resilient retention adjacent the log 28.

A plurality of resilient members such as elastic belts 90 wrap around the heads of the clamp fingers 88, applying pressure to secure the log 28. The elastic belts 90 can comprise various elastic materials, but preferably comprise ¼" Textane brand belts manufactured by Thermoid Corporation of Chaute, Kans. Alternatively, one large elastic belt can be used for each clamp section, or the same retention mechanisms can be used as detailed for the clamp fingers 58.

The clamp outfeed section 22 can be rotated in a variety of conventional methods by the drive mechanism 24. In one preferred embodiment of the invention, a plurality of drive belts 62, shown in FIG. 2, are coupled to the frame 74 and are driven by the drive mechanism 24 providing rotation of the frame 74 and log 28. Various methods known to one of ordinary skill in the art can be used to couple the drive belts 62 to the frame 44.

Figure 3:
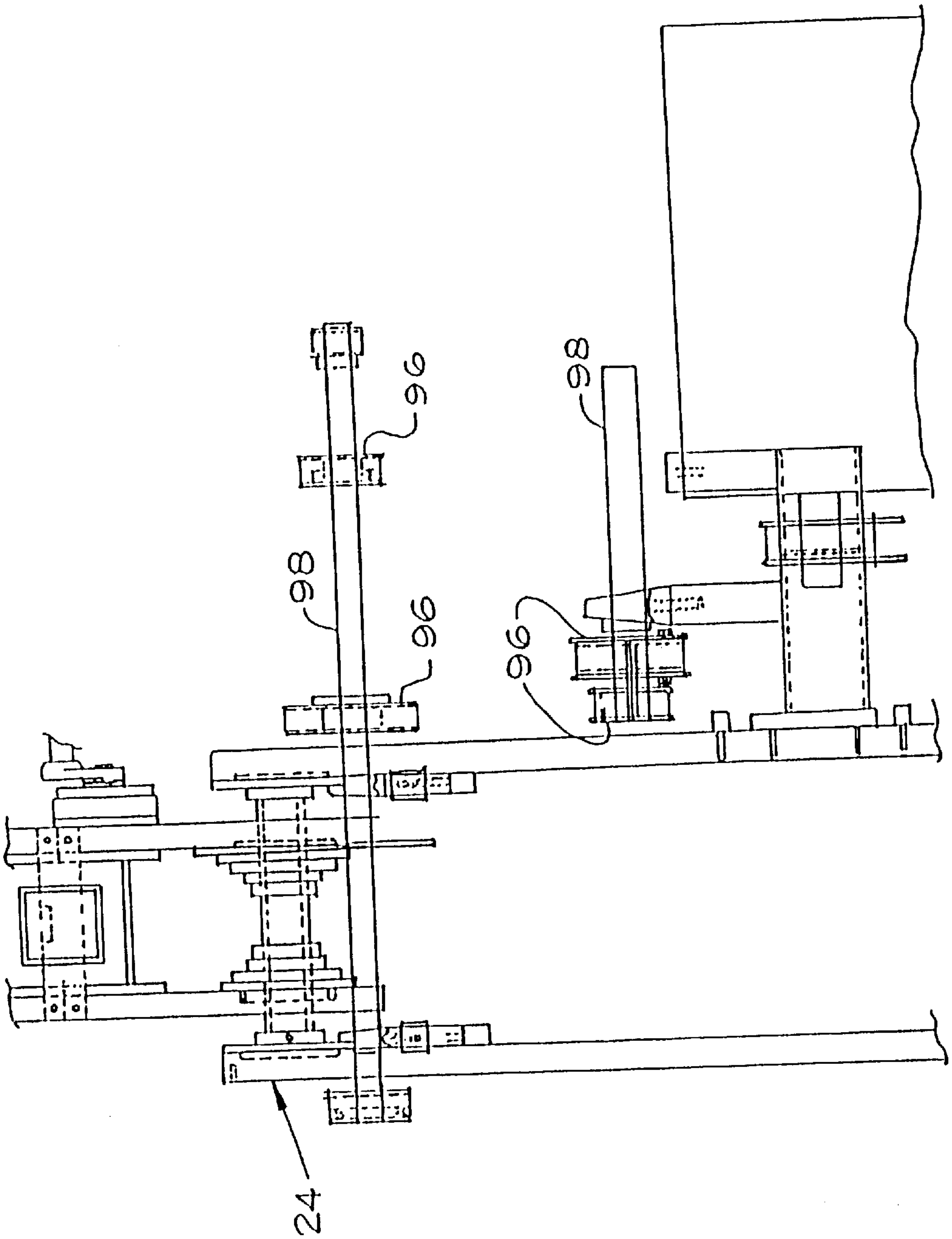
FIG. 3 is a side view of the drive mechanism shown in FIGS. 1 and 2.
Figure 5:
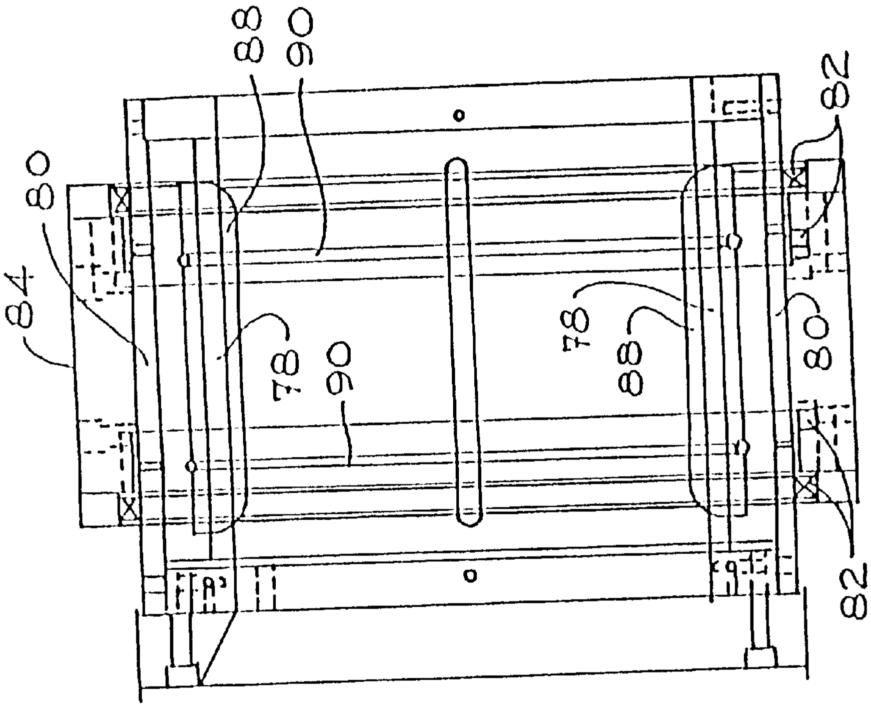
FIG. 5 is a side view of the clamp outfeed section shown in FIGS. 1 and 2.
Figure 4:
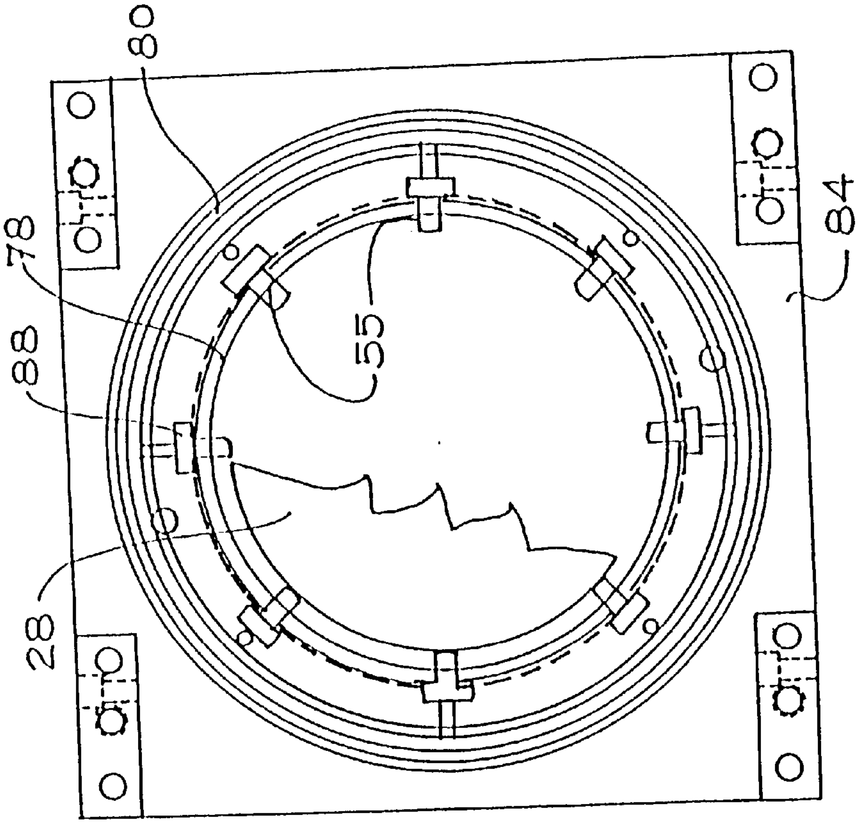
FIG. 4 is a front view of the clamp outfeed section shown in FIGS. 1 and 2.
Figure 6:
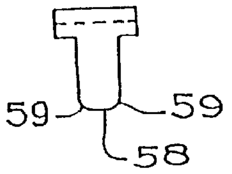
FIG. 6 is a front view of the substantially T-shaped clamp fingers shown in FIGS. 1, 3, 4, 5, and 7.

As shown in FIGS. 2 and 3, the drive mechanism 24 includes a belt, chain, and gear system 96 using various drive shafts 98 connected to a motor 72. The belts or chains connect to the frame 44, 74 to rotate the logs 28 within the clamp infeed section 16 and clamp outfeed section 22. The drive mechanism 24 similarly can drive the infeed rollers 42. The drive mechanism 24 preferably uses an electric feed-back system to synchronize the rotational speeds of the clamp infeed section 16 and clamp outfeed section 22. Other preferred embodiments synchronize the rotational speed by rotating the clamp infeed section 16 and clamp outfeed section 22 using a common jackshaft 100, shown in phantom in FIG. 1.

Accordingly, the preferred embodiments of the present invention provide a secure clamping apparatus and method that automatically adjusts for varying log diameters. For greater diameter adjustment, one need only resize the clamp fingers 58 and 88 to allow greater radial travel.

In accordance with a preferred method of the invention, the log 28 is brought up to a rotational speed of the clamp infeed section 16 and clamp outfeed section 22. The log pusher 14 then engages the log 28 and pushes the log 28 through the clamp infeed section 16, past the retracted log saw blade 20 into the clamp infeed section 22. As the log pusher 14 pushes the log 28, the beveled or chamfered edges 59 of the clamp fingers 58 engage the log 28 and facilitate the clamp fingers riding upon the log 28 for secure clamping. A beveled infeed section prior to the clamp infeed section 16 can be provided for further feeding guidance. The clamp fingers 58 preferably include chamfered or beveled edges 59 on both ends to prevent gouging of the log 28 upon exit from the infeed clamp section 16.

The rotational speeds of the clamp infeed section 16 and clamp outfeed section 22 are preferably closely matched as described above. The log saw blade 20 preferably rotates at a higher rate of speed and cuts through the exterior periphery of the log 28 first The rotation of the log 28 through at least 170 degrees prevents the log saw blade 20 from having to travel more than about half the diameter of the log 28. Further, it was discovered that this sawing process more evenly loads the log sawblade 20 and the core of the log 28, substantially reducing bias cutting and core crushing problems and increasing product quality. Further, decreased deflection of the log saw blade 20 under the more even lateral loading of the present invention can prolong log saw blade 20 life.

Typically, a small length or "cookie" is cut from the leading edge of the log 28 to eliminate the ragged edge produced by most rewinding processes. Therefore, the log 28 is generally pushed into the clamp infeed section 22 a short distance at first. The clamp fingers 88 in the outfeed section 22 preferably include chamfered or beveled edges for similar reasons as the clamp fingers 58.

While preferred embodiments of the invention have been shown and described, it will be clear to those skilled in the art that various changes and modifications can be made without departing from the invention in its broader aspects as set forth in the claims provided hereinafter.

I claim:

1. A saw clamp for clamping a product roll to be sawn, comprising:

a clamp infeed section and a saw blade, said clamp infeed section including elongated clamp fingers resiliently retractable to receive a product roll to be sawn and biased against the product roll during sawing of at least a portion of the product roll by the saw blade.

2. The saw clamp as defined in claim 1, wherein said clamp infeed section is disposed for rotation together with a product roll to be sawn during sawing of at least a portion of the product roll by the saw blade.

3. The saw clamp as defined in claim 1, wherein said saw blade travels into the product roll through a distance no greater than about one-half of the diameter of the product roll.

4. The saw clamp as defined in claim 1, wherein said elongated clamp fingers are substantially T-shaped.

5. The saw clamp as defined in claim 1, wherein the clam fingers are biased against the product roll by an elastic belt.

6. The saw clamp as defined in claim 1, further including a staging section including a plurality of rollers for substantially matching rotational speed of the product roll to rotational speed of said clamp infeed section.

7. The saw clamp as defined in claim 6, wherein said matching of rotational speed takes place prior to a pusher pushing the product roll into said clamp infeed section.

8. The saw clamp as defined in claim 4, wherein said substantially T-shaped members include at least one substantially beveled portion for allowing said substantially T-shaped members to ride up on the product roll for clamping.

9. A method of sawing a product roll, comprising the steps of:

providing a product roll to be sawn;

receiving the product roll within a clamp having clamp fingers;

moving the product roll between the clamp fingers to spread the clamp fingers apart;

clamping the product roll in the clamp by resiliently biasing the clamp fingers against at least a portion of the product roll; and sawing at least a portion of the product roll with a saw disposed adjacent said clamp.

10. The method as defined in claim 9, wherein said clamp comprises a clamp infeed section and a clamp outfeed section located on opposite sides of a saw blade.

11. The method as defined in claim 9, wherein said clamp is disposed for rotation.

12. The method as defined in claim 9, wherein the product roll is rotated more than 170 degrees.

13. The method as defined in claim 9, wherein a blade of said saw travels into the product roll through a distance no greater than about one-half of the diameter of the product roll.

14. The method as defined in claim 10, wherein said clamp infeed section and said clamp outfeed section each include substantially T-shaped clamp fingers biased toward the product roll by at least one resilient member.

15. The method as defined in claim 14, wherein said resilient member comprises an elastic belt.

16. The method as defined in claim 9, further including the step of substantially matching rotational speed of the product roll to rotational speed of a clamp infeed section before the product roll is clamped.

17. A radial saw clamp for clamping a product roll, comprising:

a clamp infeed section and a clamp outfeed section located on opposite sides of a saw blade, said clamp infeed and outfeed sections relatively positioned to receive product rolls moved into and through the clamp, each of said clamp infeed outfeed sections including clamp fingers resiliently biased toward the product roll.

18. The saw clamp as defined in claim 17, wherein said clamp fingers are elongated and substantially T-shaped.

19. The saw clamp as defined in claim 17, wherein said resilient biasing is provided by an elastic belt.

20. The saw clamp as defined in claim 17, wherein said clamp infeed section and said clamp outfeed section rotate at substantially the same speed during cutting of at least a portion of the product roll.

* * * * *